US000001481H

United States Statutory Invention Registration [19]

[11] Reg. Number: H1481

Ray

[43] Published: Sep. 5, 1995

[54] OFFSET CORRUGATED SANDWICH CONSTRUCTION

[75] Inventor: Hemen Ray, Perkasie, Pa

[73] Assignee: The United States of America as represented by the Secretary of the Navy, Washington, D.C.

[21] Appl. No.: 82,069

[22] Filed: Jun. 23, 1993

[51] Int. Cl.[6] ..... B32B 5/00
[52] U.S. Cl. ..... 428/98; 428/114
[58] Field of Search ..... 428/98, 114

[56] References Cited

U.S. PATENT DOCUMENTS

| | | | |
|---|---|---|---|
| 3,542,636 | 11/1970 | Wandel | 161/114 |
| 3,574,103 | 4/1971 | Latkin | 161/43 |
| 4,472,473 | 9/1984 | Davis et al. | 428/184 |
| 4,769,968 | 9/1988 | Davis et al. | 52/814 |
| 5,028,474 | 7/1991 | Czaplicki | 428/178 |
| 5,162,143 | 11/1992 | Porter et al. | 428/179 |

*Primary Examiner*—Donald P. Walsh
*Assistant Examiner*—Chrisman D. Carroll
*Attorney, Agent, or Firm*—James V. Tura; James B. Bechtel; Susan E. Verona

[57] ABSTRACT

A sandwich construction is disclosed that provides alternating offset and adjacent corrugated strips secured between upper and lower face sheets. The peaks of one strip are adjacent the troughs of an adjacent strip. The peaks and troughs can have flattened portions and the face sheets can be secured to said portions.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OFFSET CORRUGATED SANDWICH CONSTRUCTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to sandwich constructions suitable for use in structural and non-structural members, and more particularly to sandwich constructions of low-density cores bonded between thin-gauge, high-strength face sheds for use in a wide range of military, industrial and commercial components.

Sandwich constructions are finding broad application as structural and non-structural members in boats, aircraft, furniture, appliances, and other items requiring high strength, light-weight materials. They typically include face sheets bonded to either side of a low density core and can be made of such materials as metals, plastics or composite fiberglass laminates for rigidity and strength. Among the various core materials are rigid plastic foams, honeycombs, truss-core corrugations and an arrangement of adjacent, inclined rectangular-shaped facets connected by intermediate rows of adjoining parallelagram-shaped facets.

In aircraft design the need for weight efficiency and aerodynamically smooth surfaces under high stress levels has stimulated use of sandwich construction as a possible substitute for the conventional sheet-stringer construction. Notwithstanding the superior weight-efficiency of the sandwich constructions, their general acceptance for critical applications has lagged behind theoretical development primarily because of maintenance problems experienced in service. Honeycomb core sandwich constructions, for instance, are considered to be among the most weight-efficient but, due to their tendency to retain moisture which may become entrapped due to ineffective edge seals or unbonding of face sheets from the core. This may degrade the structural integrity and lead to extensive corrosion and premature failure of components. Experience has shown a significant frequency of repairs on replacements which are very time-consuming and expensive.

SUMMARY OF THE INVENTION

Accordingly, an object of the present invention is to provide a sandwich construction having a high strength-to-weight efficiency suitable for a broad variety of military, industrial and commercial applications.

Another object is to provide a low-density core sandwich construction in which corrosion and degradation of structural integrity due to retention of moisture is substantially eliminated.

Another object is to provide a sandwich construction in which unbonding of face sheets from the core is substantially reduced or eliminated when heat, pressure or vacuum is applied for purposes of repair.

Still another object is to provide a sandwich construction having a flexible core with structural discontinuities for improved tolerance for damage.

These and other objects of the invention are achieved in a sandwich construction comprising strips of corrugations arranged adjacent one another and alternately offset so that a series of peaks is next to a series of troughs, and vice versa, and contained between upper and lower face sheets. By arranging the strips in this alternating fashion, a plurality of passage-ways from cell to cell is provided. The outer face sheets and the strips are cocured in one operation without any secondary bonding.

The novel features which are believed to be characteristics of the invention, both as to its organization and methods of operation, together with further objects and advantages thereof, will be better understood from the following descriptions in connection with the accompanying drawings in which the presently preferred embodiments of the invention are illlustrated by way of examples. It is to be expressly understood, however, that the drawings are for purposes of illustration and description only and are not intended as a definition of the limits of the invention.

DETAILED DESCRIPTION OF THE PREFERRED EMBODIMENT

Figure 1:
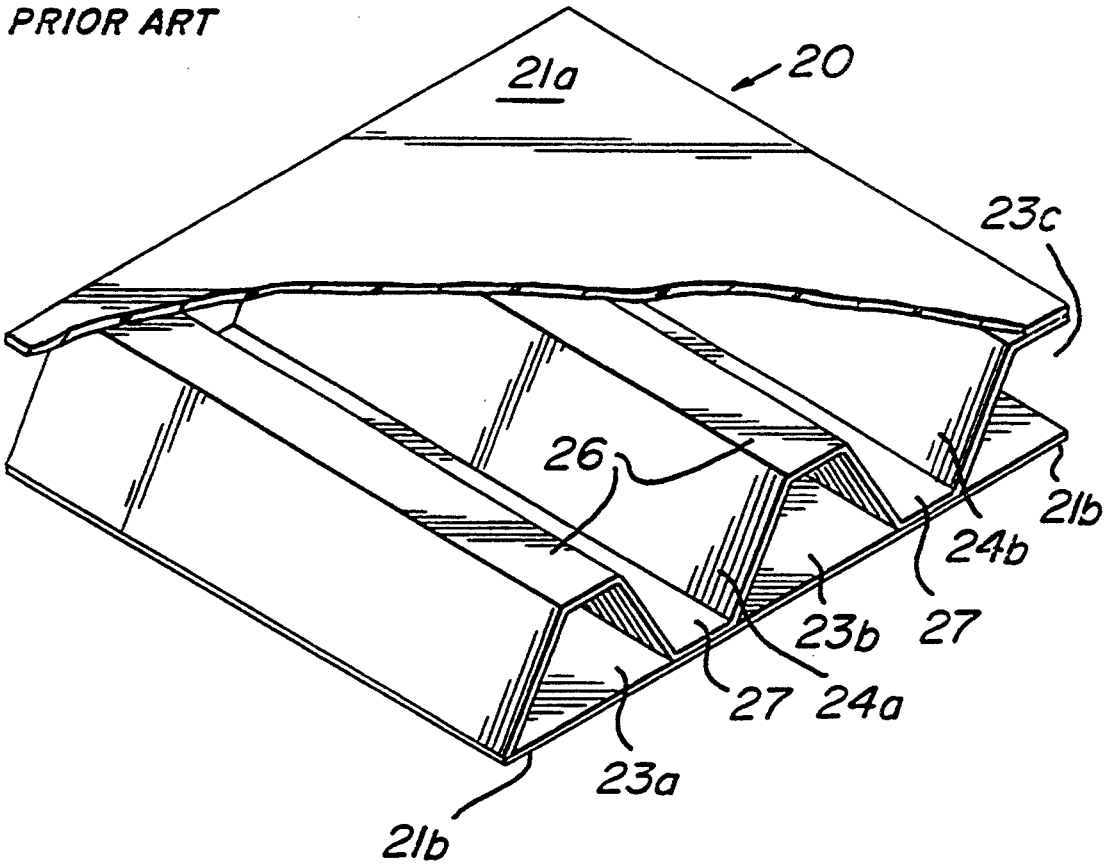
FIG. 1 PRIOR ART
FIG. 1 shows a partially cutaway, perspective view of a prior art corrugated sandwich construction.
Figure 5:
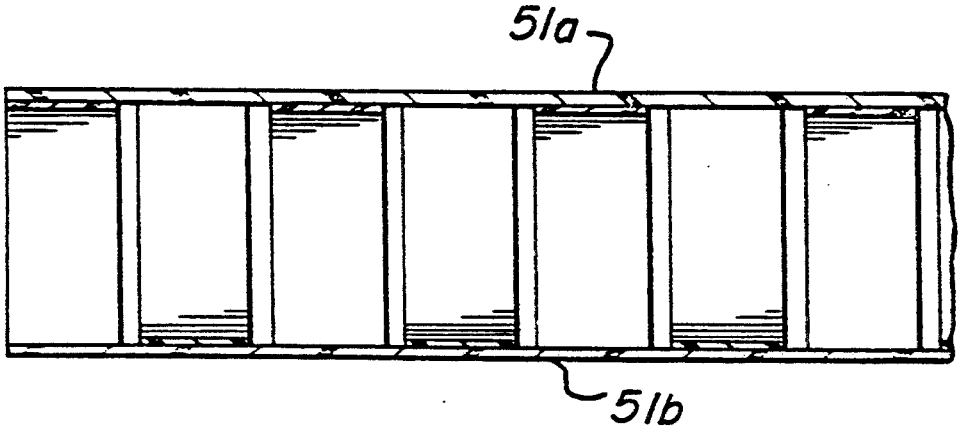
FIG. 5 shows a cross-sectional view of the offset corrugations, taken along lines V–V of FIG. 3.

Referring now to the drawings wherein like referenced characters designate like or corresponding components throughout the several views, there is shown in FIG. 1 a typical prior art corrugated sandwich construction 20 having open cells 23*a,b* and *c* alternately adjacent open cells 24*a,b,* contained between face sheets 21*a* and *b.* The only difference between the cells being that cells 23*a,b* and *c* have a flat roof section 26 adjacent face sheet 21*a* and cells 24*a,b* have a flat roof section 27 adjacent face sheet 21*b.* Cells 23 and 24 are formed by corrugations, consisting of peaks and troughs, in a core material, which can be various metals, plastics, composites or non-composites, and face sheets 21*a* and *b* are bonded to appropriate roof sections 26 and 27, respectively. Under stress, the face sheets may crack or separate from the cells, permitting moisture to accumulate therein, and with time, cause the core material to increase in weight and corrode. The usual procedure for repair entails cleaning out any damage and resealing the face sheets by applying heat and pressure (or vacuum) thereto. This is unreliable and sometimes causes further problems with the face sheets.

Figure 2:
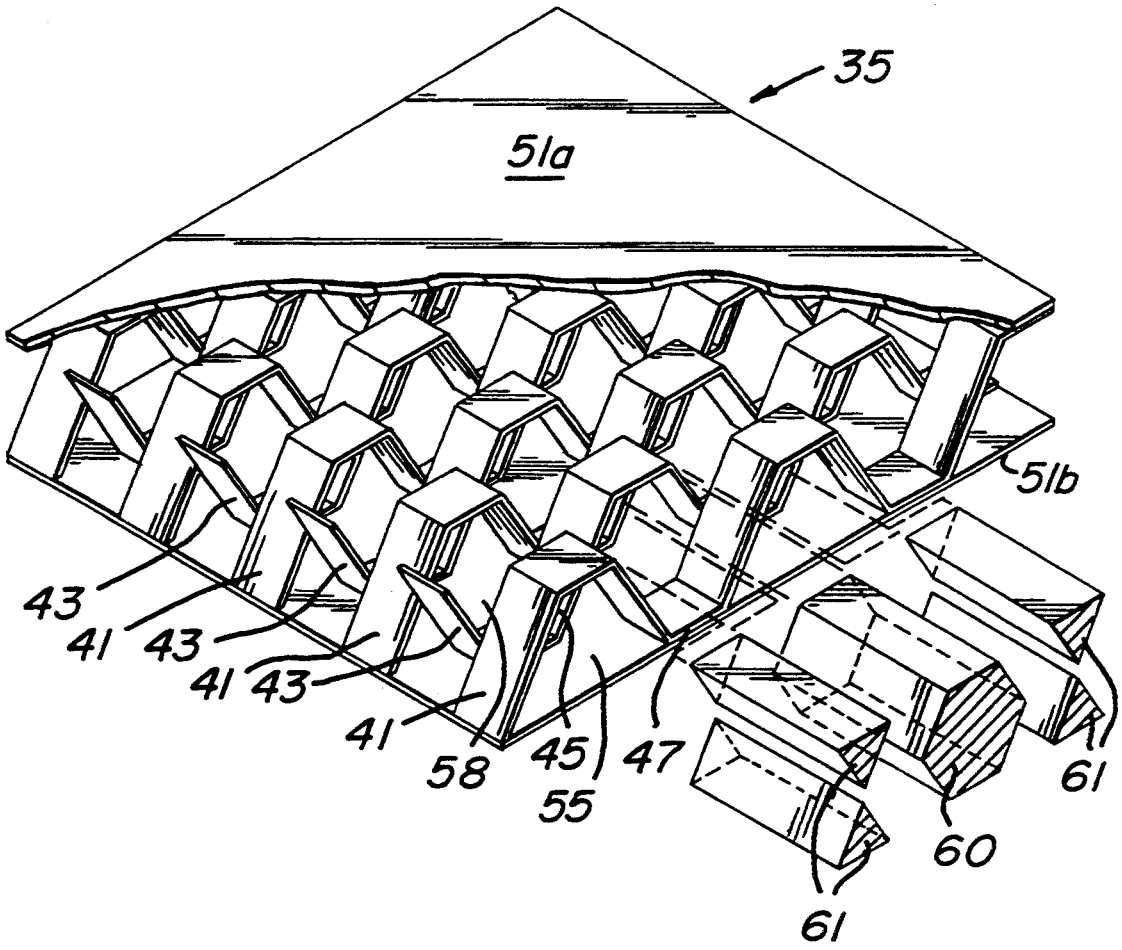
FIG. 2 shows a similar view of the instant invention, showing offset corrugationns that provide moisture pathways and also showing a series of shape-mandrels, extended from inside the corrugations, that can be used to form the offset pattern.
Figure 3:
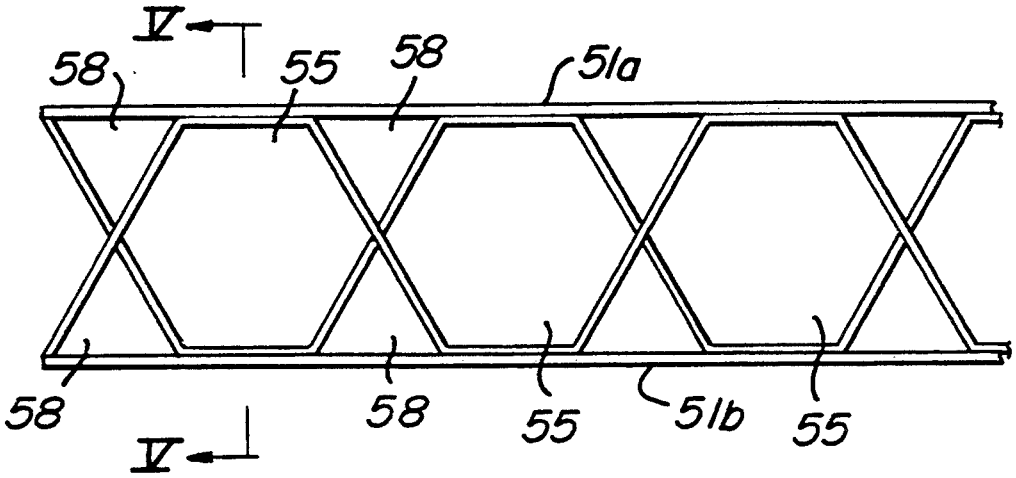
FIG. 3 shows a front elevation of the offset corrugation construction.
Figure 4:
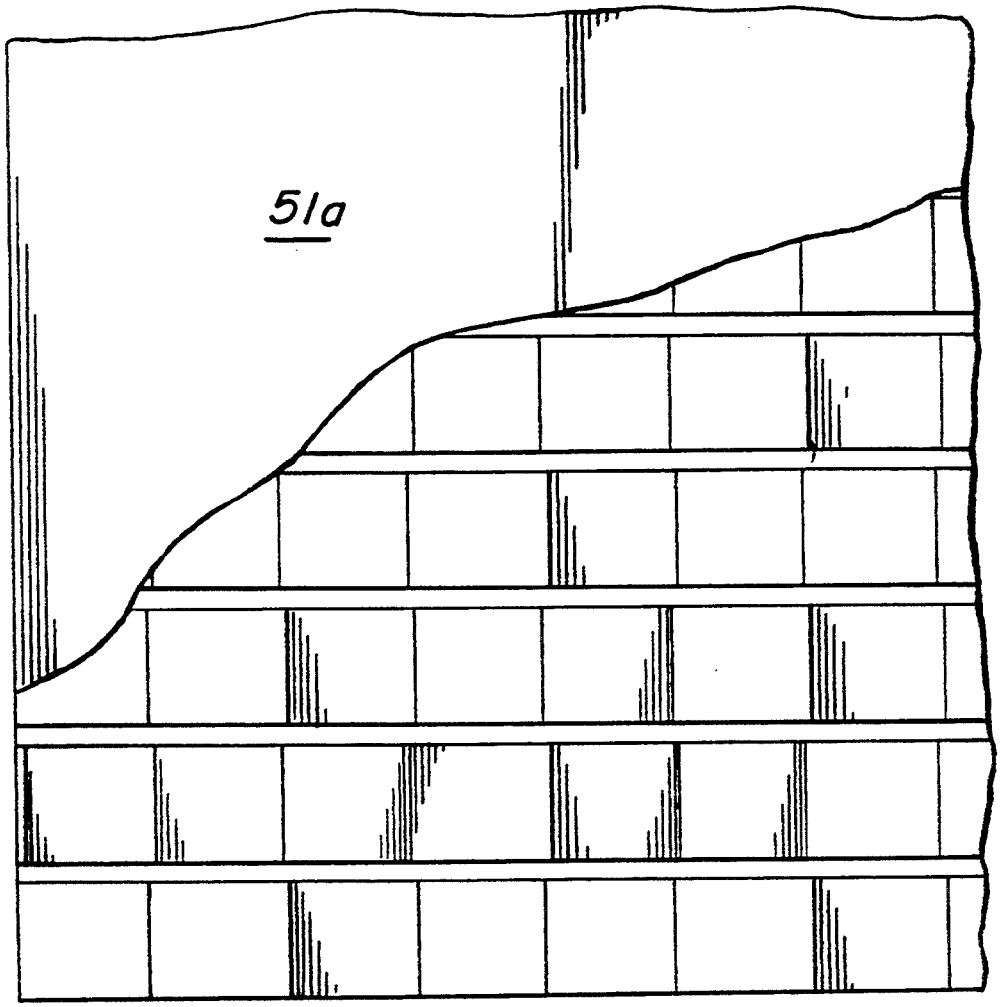
FIG. 4 shows a top view, with the upper face sheet partially cut away of the offset corrugations.

Referring now to the inventive embodiment of FIGS. 2 through 5, there is shown a sandwich construction 35 comprising corrugated strips 41 and 43, each having peaks 45 and troughs 47, offset, or out of phase by a predetermined amount, contained between upper and lower face sheets 51*a* and *b,* respectively. This offset corrugated construction provides hexagonally shaped cells 55 surrounded on either side by individual triangular cells 58. The material used for a particular core is separated into strips 41, of approximately one-half inch in width and wrapped around a set of mandrels 60,61, as shown in FIG. 2. Strips 41 can be of any suitable size and can depend on the overall size and strength of the sandwich construction. Mandrels 60,61 maintain the desired shape and spacing during attachment of face sheets 51*a* and *b*, but are then removed after the cocuring operation. This design allows pathways for any moisture that may find its way into the core. Mandrels 60,61 can be any solid type material, such as TFE or other similar materials, to facilitate removal after curing.

Experimental work with a test sample constructed with this offset corrugated core, as compared to a sample constructed using a prior art design, shows a 56% increase in transverse shear stiffness in the weaker direction (in the direction of corrugation). A comparison of bending stiffness shows no measurable difference between the two.

Finally, while the offset corrugated core sandwich construction has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What I claim is:

1. A sandwich construction comprising:

offset corrugated means having a plurality of substantially parallel cells, each cell being formed by alternating peaks and troughs and having moisture communication with each other adjacent cell; and face sheet means secured to opposite sides thereof.

2. A sandwich construction as described in claim 1 wherein each said peak is substantially flat.

3. A sandwich construction as described in claim 2 wherein each said trough is substantially flat.

4. A sandwich construction as described in claim 3 wherein said face sheet means is attached to the offset corrugated means at the flat peaks and troughs.

5. A sandwich construction comprising:

adjacent corrugated strips arranged to have peaks of a first strip substantially next to troughs of a second strip to form an offset pattern; and upper and lower face sheets secured thereto.

6. A sandwich construction as described in claim 5 wherein said corrugated strips are substantially one-half inch wide.

* * * * *